(12) United States Patent
Menconi et al.

(10) Patent No.: US 6,723,809 B1
(45) Date of Patent: Apr. 20, 2004

(54) BIMETAL CATALYST FOR THE (CO) POLYMERIZATION OF α-OLEFINS

(75) Inventors: Francesco Menconi, Lucca (IT); Giuseppe Conti, San Donato Milanese-Milan (IT); Alberto Zanellato, San Giuliano Milanese-Milan (IT); Angelo Moalli, Castelletto Ticino-Novara (IT)

(73) Assignee: Polimeri Europa S.r.l., Brindisi (IT)

( * ) Notice: Subject to any disclaimer, the term of this patent is extended or adjusted under 35 U.S.C. 154(b) by 0 days.

(21) Appl. No.: 09/926,214

(22) PCT Filed: Mar. 20, 2000

(86) PCT No.: PCT/EP00/02471

§ 371 (c)(1), (2), (4) Date: Jan. 18, 2002

(87) PCT Pub. No.: WO00/58368

PCT Pub. Date: Oct. 5, 2000

(30) Foreign Application Priority Data

Mar. 25, 1999 (IT) .......................................... MI99A0609

(51) Int. Cl.$^7$ .................................................. C08F 4/42
(52) U.S. Cl. ................... 526/124.3; 526/348; 526/142; 526/123.1; 502/103; 502/113; 502/115; 502/120
(58) Field of Search .............................. 526/348, 142, 526/123.1, 124.3; 502/103, 113, 115, 120

(56) References Cited

U.S. PATENT DOCUMENTS 6,184,316 B1 2/2001 Masi et al.

FOREIGN PATENT DOCUMENTS

| EP | 0 449 355 | | 10/1991 |
|----|-----------|---|---------|
| EP | 0 523 785 | | 1/1993 |
| EP | 0 523 785 A2 | * | 1/1993 |

* cited by examiner

Primary Examiner—Ling-Siu Choi
(74) Attorney, Agent, or Firm—Oblon, Spivak, McClelland, Maier & Neustadt, P.C.

(57) ABSTRACT

Bimetal catalyst for the (co)polymerization of α-olefins comprising a co-catalyst consisting of a hydride or an organometallic compound of an element of groups 1, 2 or 13 of the periodic table, and a solid component consisting of at least 95% by weight of titanium, magnesium, hafnium, aluminum, chlorine and R—COO carboxylate groups, wherein R is an aliphatic, cycloaliphatic or aromatic hydrocarbon, containing from 1 to 30 carbon atoms, wherein at least 80% of the titanium is in oxidation state +3, and at least 1% of said titanium in oxidation state +3 has a tetrahedral coordination geometry. Said catalyst allows the production of olefinic polymers, particular polyethylene, with a high molecular weight by means of solution polymerization processes at temperatures exceeding 200° C.

49 Claims, 2 Drawing Sheets

BIMETAL CATALYST FOR THE (CO) POLYMERIZATION OF α-OLEFINS

Figure 1:
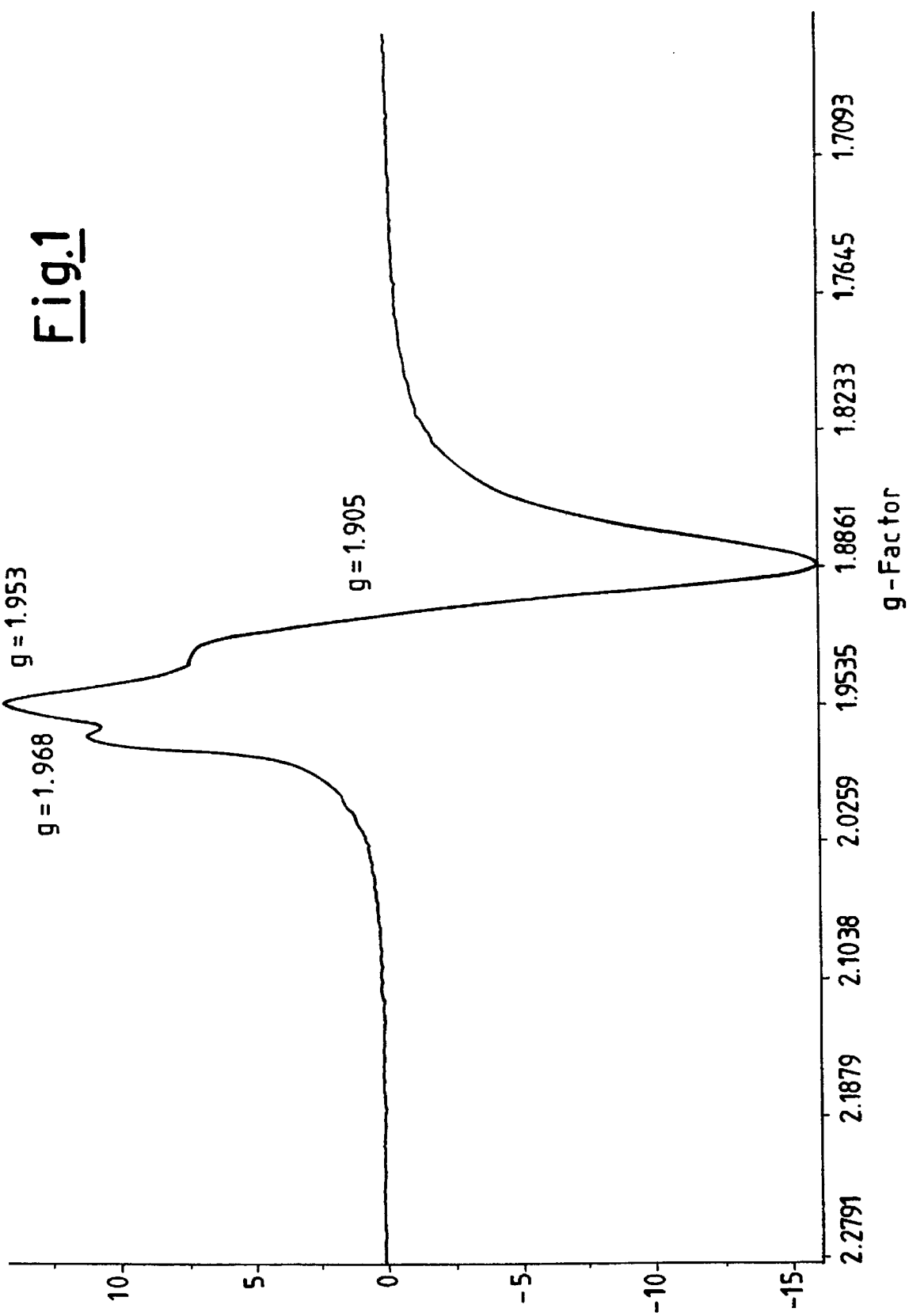

The present invention relates to a bimetal catalyst, the process for its preparation and its use in (co)polymerization processes of α-olefins.

More specifically, the present invention relates to a catalyst for the (co)polymerization of α-olefins of the Ziegler-Natta type, comprising a solid component containing titanium, and a co-catalyst consisting of a hydride or an organometallic compound of groups 1, 2 or 13 of the periodic table of elements (in the form approved of by IUPAC and published by "CRC Press Inc." in 1989, to which reference will be made hereafter) This catalyst can be obtained by means of an original process set up by the Applicant.

It is known that ethylene, or α-olefins in general, can be polymerized by means of low, medium or high pressure processes on catalysts of the Ziegler-Natta type to give substantially linear polymers with a high molecular weight. These catalysts are generally composed of a compound of elements from group 4 to group 6 of the periodic table in contact with an organometallic compound, or a hydride, of elements of groups 1, 2 or 13 of the same periodic table.

Solid components of Ziegler-Natta catalyst containing a transition metal (generally titanium) a bivalent metal (generally magnesium), a halogen (generally chlorine) and optionally also an electron donor, are known in the art. These solid compounds used in combination with an organometallic compound of aluminum, form catalysts active in (co)polymerization processes of ethylene, in processes carried out at a low temperature and pressure. For example the patent U.S. Pat. No. 3,642,746 describes a solid component of catalyst obtained by contact of a compound of a transition metal with a halide of a bivalent metal treated with an electron donor. According to the patent U.S. Pat. No. 4,421,674 a solid component of catalyst is obtained by contact of a compound of a transition metal with the spray-drying product of a solution of magnesium chloride in ethanol.

According to the patent UK 1,401,708, a solid component of catalyst is obtained by the interaction of a magnesium halide, a non-halogenated compound of a transition metal and an aluminum halide. Patents U.S. Pat. No. 3,901,863 and U.S. Pat. No. 4,292,200 describe solid components of catalyst obtained by putting a non-halogenated compound of magnesium, a non-halogenated compound of a transition metal and an aluminum halide in contact with each other.

The patent U.S. Pat. No. 4,843,049 and European patent application EP-A 243,327 describe a solid component of catalyst which contains titanium, magnesium, aluminum, chlorine and alkoxyl groups, highly active in (co) polymerization processes of ethylene, carried out at low pressure and temperature, with the suspension technique, and at high pressure and temperature, in vessel or tubular reactors, respectively. These solid components are generally obtained by spray-drying an ethanol solution of magnesium chloride to obtain an active carrier, which is interacted in sequence with a titanium tetraalkoxide or with titanium tetrachloride and with an alkyl aluminum chloride, respectively.

All the above catalysts, although relatively active in the processes indicated, are not however completely satisfactory as far as some of the properties of the polymer or copolymer obtained are concerned, with particular reference to the average molecular weight, especially of polyolefins from high temperature processes, which are still unsuitable for certain industrial uses. In addition, there is still room for further improving the activity of the above catalysts.

Attempts have been made to modify the properties of the polymers or copolymers of olefins by using catalysts based on a mixture of transition metals. For example, European patent applications EP-A 177,189 and EP-A 146,507, both describe the preparation and use of catalysts of the Ziegler-Natta type comprising titanium and hafnium in order to obtain polyethylene with a widened (bimodal) molecular weight distribution. The process for the preparation of these catalysts comprises the introduction of titanium and hafnium in two separate steps.

European patent application EP-A 523,785 discloses that the introduction of magnesium-carboxylate and transition metal-carboxylate bonds allow solid components of catalyst to be obtained which are generally improved with respect to those of the known art, in relation to their activity in (co)polymerization processes of ethylene and α-olefins, in processes carried out at low pressure and temperature, at high pressure and temperature and in solution, and in relation to the nature of the polymers thus obtained. The preparation of these catalysts containing metal-carboxylate bonds is carried out by means of a complex process which comprises mixing pre-prepared solutions of magnesium carboxylates and transition metal in an organic hydrocarbon solvent. This method however has the disadvantage of not allowing complete freedom in the selection of the atomic ratios between the metals in the catalyst, for reasons connected to their different solubility in hydrocarbon solvents.

The Applicant has now found that polymers and copolymers of α-olefins having a high molecular weight can be surprisingly obtained, also with processes having a high productivity under high temperature conditions, by using a particular bimetal catalyst of the Ziegler-Natta type supported on magnesium chloride, which has the additional advantage of a particularly simple and convenient preparation process.

In accordance with this, in a first aspect, the present invention relates to a solid component of a catalyst for the (co)polymerization of α-olefins consisting of at least 95% by weight, preferably from 98 to 100% by weight, of titanium, magnesium, at least one metal selected from hafnium and zirconium, aluminum, chlorine and R—COO carboxylate, in the following molar ratios:

M/Ti=0.1–10.0; Mg/Ti=1.0–20.0; Al/Ti=0.01–6.0

Cl/Ti=2.0–70.0; R—COO/Ti=0.1–10.0 wherein: R is an aliphatic, cycloaliphatic or aromatic hydrocarbon radical, containing from 1 to 30 carbon atoms, and M is a metal selected from hafnium and zirconium or one of their mixtures, and is preferably hafnium, characterized in that at least 80%, preferably at least 90%, of the titanium is in oxidation state +3, and in addition, at least 1%, preferably from 2 to 10%, of said titanium in oxidation state +3 has a tetrahedral coordination geometry.

The number of carbon atoms of the radical R of said carboxylate is not particularly critical, however it preferably ranges from 6 to 15.

The term "(co)polymerization", as used in the present description and claims in reference to α-olefins, refers to both the homopolymerization of an α-olefin, for example ethylene to form high density crystalline polyethylene or propylene to form polypropylene, and also to the co-polymerization of an α-olefin with at least one different unsaturated compound copolymerizable therewith (obviously comprising a different α-olefin), for example, the copolymerization of ethylene with ethylidenenorbornene to form a cross-linkable polyethylene, or the copolymerization of ethylene with 1-butene to form linear low density polyethylene.

For the sake of simplicity, the term "mole" and "molar ratio" are used in the present description and claims, both with reference to compounds consisting of molecules and also with reference to atoms and ions, avoiding, for the latter, the use of the terms gram-atom or atomic ratio, even these are more scientifically correct.

According to another aspect, the present invention relates to a process for the preparation of the above solid component of catalyst, comprising the following steps in succession:

(i) preparing a mixture of at least one compound of magnesium a compound of titanium and a compound of a metal M as defined above, in the appropriate proportions, in a medium consisting of an inert organic liquid, in which at least one of said compounds is insoluble;

(ii) preparing a substantially limpid solution by the addition to said mixture of step (i) of a sufficient quantity of a carboxylic acid having the formula R—COOH (I), wherein R is an aliphatic, cycloaliphatic or aromatic hydrocarbon radical, containing from 1 to 30 carbon atoms, and maintaining this, under suitable conditions of pressure and temperature, until the substantial dissolution of all the insoluble compound;

(iii) adding and reacting with the solution obtained in step (ii) an alkyl aluminum chloride which can be represented with the following general formula (II):

$$AlR'_n Cl_{(3-n)} \quad (II)$$

wherein R' is a linear or branched alkyl radical, containing from 1 to 20 carbon atoms, and "n" is a decimal number having values ranging from 0.5 to 2.5, preferably from 0.9 to 2.1;

in a quantity which is at least sufficient to make at least 70%, preferably at least 80% of the titanium present in the solution of said step (ii) precipitate into the form of a solid compound, and (iv) separating the solid precipitated in step (iii) from the residual liquid, to obtain said solid component of catalyst.

The term insoluble, as used in the present description and claims, in reference to the mixture of a solid compound in a liquid, means that more than 90% of said solid compound remains undissolved in said liquid.

The liquid used for preparing the mixture of step (i) of the process can be any organic liquid inert (non-reactive) towards the other constituents of the mixture. In particular, this inert solvent should at least be aprotic, i.e. without reactive acid protons such as those of alcohol, amine and acid groups. Coordinating organic liquids, i.e. capable of forming adducts with the ions of metals which form the above solid component of catalyst, are also considered as being reactive, and are therefore not suitable according to the present invention. Apolar or slightly polar liquids, and particularly aliphatic, cycloaliphatic or aromatic hydrocarbons which are liquid under the operating conditions, are preferred for the purpose, such as, for example hexane, heptane, octane, nonane, decane, undecane, dodecane, cyclopentane, cyclohexane, benzene, toluene, xylenes and mesitylenes.

Non-limiting examples of R—COO carboxylate groups, in the solid component of catalyst of the present invention are those wherein:

the radical R is a linear alkyl containing at least 4 carbon atoms; for example n-butyrate, n-octoate, n-decanoate, n-undecanoate and n-dodecanoate groups;

the radical R is a branched alkyl carrying a branching on the secondary carbon atom in α with respect to the carbon of the carboxyl:

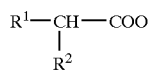

wherein the sum of the carbon atoms in $R^1$ and $R^2$ is equal to at least 2; for example isobutyrate, 2-methyl butyrate and 2-ethylhexanoate groups;

the radical R is a branched alkyl carrying two branchings on the tertiary carbon atom in α with respect to the carbon of the carboxyl:

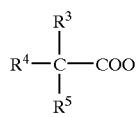

wherein the sum of the carbon atoms in $R^3$, $R^4$ and $R^5$ is equal to at least 3; for example 2,2-dimethyl propanoate and versatate groups;

the radical R is an alkyl carrying a branching on the secondary carbon atom in β with respect to the carbon atom of the carboxyl:

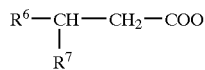

wherein the sum of the carbon atoms $R^6$ and $R^7$ is equal to at least 4; for example 3-ethyl pentanoate and citronellate groups;

the radical R is a cycloalkyl, aryl, alkylcycloalkyl or alkylaryl:

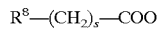

wherein $R^8$ represents the cycloalkyl or aryl portion, monocyclic or with several condensed or non-condensed cycles, and "s" is an integer, varying from 0 to 10; for example a naphthenate, benzoate, p-ethylbenzoate, benzylcarboxylate, cyclohexanoate group;

the radical R is an alkyl substituted with aryl in position a with respect to the carbon atom of the carboxyl:

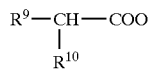

wherein $R^9$ is an aryl, for example a phenyl and $R^{10}$ is an alkyl containing at least 1 carbon atom; for example a 2-phenylbutyrate group.

Also comprised in the definition of R—COO carboxylate according to the present invention are mixtures of carboxylates having different R groups containing from 1 to 30 carbon atoms, according to what has been defined above.

The solid component according to the present invention is characterized by an X-ray spectrum typical of a structure characterized by rototranslational disorder, defined as "δ phase" according to the usual technical terminology, for example in the publication of G. Natta, P. Corradini, G. Allegra, "Journal of Polymer Science", Volume 51 (1961), page 399. In accordance with what has been observed by the Applicant, this solid component is characterized however by a very particular electronic and coordinative environment which has so far not been observed in catalysts of the Ziegler-Natta type containing carboxylic groups. In accordance with this, the titanium atoms, on which the catalytic center is thought to be formed, prevalently have (at least 80%) oxidation state +3, and at least 1% of the latter have a tetrahedral coordination geometry. This latter characteristic of the solid component of catalyst can be observed by means of electronic spin resonance spectroscopy (ESR), to which titanium atoms in oxidation state +3 are sensitive. For further details on this test method and its application to Ziegler-Natta type systems, reference can be made to the publication of P. Brant and A. N. Speca "Macromolecules", vol. 20, Nr. 11 (1987), pages 2740–2744, whose content is included as reference herein. In particular, on examining any sample of the solid component of catalyst of the present invention, one can observe the presence in the ESR spectrum, of three absorption signals distinguished by "g" factors at 1.905, 1.953 and 1.968 respectively, the first two being attributed to an octahedral coordinative neighborhood and the third to a tetrahedral coordinative neighborhood, which also allow a sufficiently accurate determination of the relative quantity of titanium +3 which experiments either the one or other coordinative geometry. In particular, the Applicant has found that the solid component of the present invention contains at least 1%, preferably from 2 to 10%, of titanium with tetrahedral coordination, in the sense indicated above. On the contrary, solid components of catalyst containing Ti and a second metal M of group 4, i.e. Zr, Hf or one of their mixtures, obtained according to the procedure described in European patent application EP-A 523,785, show, upon ESR analysis, the presence of titanium +3 essentially completely with an octahedral coordinative neighborhood, as can be observed from FIG. 2 enclosed with the present description, wherein the signal having the value of "g" 1.968 is practically absent (except for a slight insignificant shoulder), whereas the other two signals having values of "g" 1.905 and 1.946 are very clear. Although it is not possible at the moment to formulate any theory explaining these differences and their influence on the behaviour of the respective catalysts, it has been found that the latter prove to be much more disadvantageous with respect to the catalysts of the present invention, both in terms of polymerization activity of the olefins and in terms of molecular weight of the polymers produced, especially in high temperature processes.

It is not necessary for said solid component of catalyst to exclusively consist of the above-mentioned titanium, magnesium, zirconium, hafnium, aluminum, chlorine and carboxylate, as it is possible for the presence of up to 5% by weight of other constituents or impurities, normally deriving from counter-ions of the compounds used as precursors, for example alcoholates, bromine, phosphate groups, fluorine, etc. without there being any particular drawback. The presence, preferably not higher than 1% by weight, of impurities of other metals present in the precursors of the solid component of catalyst, is also possible without significantly modifying its advantageous properties. However solid components of catalyst having the smallest possible amount of impurities, particularly not higher than 2% by weight, are preferable.

The quantity of titanium contained in the solid component of the present invention preferably does not exceed 10% by weight, and more preferably ranges from 1 to 5% by weight. Contents of titanium exceeding 10% by weight do not offer any additional advantage in terms of activity of the catalyst, presumably due to the fact that the additional titanium is present in the solid in a form which is inactive or unavailable for interaction with the olefin to be polymerized.

In a preferred embodiment of the present invention, the various constituents are present in the solid component of catalyst in the following ratios with respect to the titanium:

$M/Ti=0.3–5.0$; $Mg/Ti=5.0–15.0$; $Al/Ti=0.1–3.0$ $Cl/Ti=20.0–50.0$; $R—COO/Ti=0.5–5.0$ and form at least 99% by weight thereof. The ratio of the carboxylate with respect to the titanium preferably ranges from 1.0 to 3.0.

As already mentioned, an original and simple process has been found for the preparation of the above solid component of catalyst, substantially comprising four steps.

In step (i) a mixture of an inert liquid is prepared, comprising the precursor compounds of the elements titanium, magnesium, hafnium and/or zirconium. These compounds can be selected from a wide range of known compounds, organometallic and inorganic, of these metals, both soluble and insoluble in the pre-selected inert liquid, which is preferably a hydrocarbon. At least one of these compounds, preferably at least two and more, preferably compounds of magnesium, hafnium and/or zirconium are insoluble in said inert liquid and form a suspension with it. All the precursor compounds which form the mixture can also be insoluble in the inert liquid selected for step (i). In a particularly preferred embodiment, at least 50% by weight, with respect to the total, of the above compounds is insoluble in the pre-selected inert liquid. These compounds are preferably mixed with the inert liquid with an overall concentration of the metals (both soluble and insoluble) ranging from 0.05 to 2.0 moles/l, more preferably from 0.1 to 1.0.

The compounds of titanium, magnesium, hafnium and zirconium can be selected by experts in the field from those already in existence, preferably from those most suitable for being made soluble by the addition of a carboxylic acid in the subsequent step (ii). The selection of the compounds most suitable for the purpose can be effected on the basis of the solubility parameters of each compound, if known, or with simple preliminary solubility tests in the presence of the carboxylic acid selected. Non-limiting examples of suitable compounds of titanium, hafnium, zirconium and magnesium, either soluble or insoluble, are chlorides, bromides, alcoholates, hydrides, β-diketonates, β-acylesters, amides, carbonates, phosphates, compounds mixed with said counter-ions and mixtures of these groups of compounds. Halides, especially chlorides, and halides combined with alcoholates are particularly preferred.

In a preferred embodiment of the present invention, magnesium, hafnium and/or zirconium, are introduced into the mixture of step (i) as chlorides in the form of granular-solids or in powder form.

The mixture of step (i) can be prepared by the simple addition and mixing of the metal compounds, preferably in granular or powder form, to the inert liquid, in any order.

The temperature and pressure in this case are not critical parameters, provided the liquid remains as such. Normal conditions of temperature and pressure are evidently convenient for greater operating simplicity of the process. The various metal compounds of step (i) are introduced into the mixture in molar ratios selected in relation to the desired atomic ratios between the corresponding elements in the solid component obtained at the end of the process. These atomic ratios are not necessarily identical to the molar ratios of the corresponding compounds in step (i), as shifts are possible, in accordance with the present invention, in relation to the specific conditions used in the process, especially due to the different solubility of the species precipitated in step (iii), which can normally be either higher or lower than 30%, without significantly jeopardizing the estimated properties of the specific solid component of catalyst. Experts in the field are able, in normal preliminary set-up operations of the process, to check the entity of these shifts and consequently optimize the ratios of the reagents in relation to the desired atomic ratios between the elements in the end-product.

In step (ii) of the process according to the present invention, a carboxylic acid having formula (I) is added to the heterogeneous mixture of step (i) to cause the almost complete dissolution of all the solids present therein. The term "almost complete", as used herein with reference to said dissolution, means that the solution obtained at the end of step (ii) must be limpid or slightly opalescent, and should in any case have no solid particulate deposit.

The carboxylic acid having formula (I) selected evidently has the same R group as the R—COO carboxylate present in the component of catalyst to be prepared. Non-limiting examples of R groups and the relative carboxylic acids have been listed above. Functionalized R groups with substituents compatible, i.e. inert or without adverse effects, with the production process and uses of the solid component in question, such as for example, halogens such as fluorine or chlorine, are not excluded however from the general scope of the present invention.

The carboxylic acid added in step (ii) preferably has a relatively high number of carbon atoms in the chain, usually ranging from 6 to 15, to favour dissolution in a liquid medium of the hydrocarbon type. Carboxylic acids with more than 31 carbon atoms are difficult to find on the market and do not offer particular advantages with respect to those having from 20 to 31 atoms in the chain.

Step (ii) of the process of the present invention is preferably carried out at a temperature higher than room temperature to favour a rapid dissolution of the solids present in the mixture. It has been observed that once the dissolution has taken place, there is no reprecipitation on re-cooling the mixture to room temperature. The dissolution temperature preferably ranges from 20 to 150° C., more preferably from 70 to 120° C.

The carboxylic acid can be added to the heterogeneous mixture of step (i) until the solid disappears and a limpid solution is obtained, or it can be added in a predetermined quantity and the dissolution completed in a subsequent step. The quantity of carboxylic acid depends, each time, on the nature and quantity of the insoluble compounds present in the mixture of step (i). The minimum quantity is usually more or less-equal to the equivalents of insoluble metal compound present in the mixture (equivalents=moles per valence of metal). It is preferable however to use an excess of carboxylic acid which is such that the ratio between the moles of this and the equivalents of the insoluble compounds ranges from 0.5 to 2.0, more preferably from 1.0 to 1.5. For example, if 10 moles of $MgCl_2$ and 4 moles of $HfCl_4$, both insoluble, and 2 moles of titanium tetrabutylate, soluble, are present in decane in the mixture of step (i), the quantity of carboxylic acid (for example 2-ethylhexanoic acid) is more preferably selected from 36 to 54 moles.

The above carboxylic acid can be added to the mixture in pure form, or diluted with an inert solvent, preferably the same liquid of the mixture of step (i), for example to favour the mixing when the acid is solid, or for a more accurate dosage when small quantities are used.

In a particular embodiment of the present invention, the carboxylic acid is first added to the mixture of step (i) in the desired quantity, usually operating at room temperature, and the mixture thus obtained is subsequently reacted under suitable conditions of temperature and pressure until dissolution of the solids present.

Step (ii) is preferably carried out in such a way that there are no significant exchanges of material with the outside, for example in a closed container or under reflux conditions of the solvent. If hydrochloric acid develops during the reaction, due to the presence of chlorides of the above metals, this is preferably kept dissolved in the reaction mixture.

In step (iii) of the process for the preparation of the component of catalyst of the present invention, an alkyl aluminum chloride having formula (II) is reacted with the solution of step (ii) above in order to form the desired solid component of catalyst which is spontaneously separated from the liquid medium as granular precipitate. On precipitating from 80 to 100% of the titanium present in solution, the co-precipitation of magnesium and hafnium is obtained, under the conditions of the present process, in an advantageously activating form of the titanium and stable within a wide temperature range. The use of an alkyl aluminum chloride having formula (II) as precipitating reagent allows the contemporaneous precipitation of the elements into the form of mixed chlorides, or mixed choride-carboxylates, and the reduction of the titanium so that this is present in the solid component in prevalent oxidation state +3.

Alkyl aluminum chlorides having formula (II) are known and widely used in the field of the polymerization of olefins. Preferred alkyl aluminum chlorides are compounds having formula (II) wherein R' is an aliphatic radical, linear or branched, having from 2 to 8 carbon atoms. The deponent "n" in formula (II) preferably ranges from 0.9 to 2.1. Typical examples of these compounds are ethyl aluminum dichloride, diethyl aluminum chloride, ethyl aluminum sesquichloride, isobutyl aluminum dichloride, dioctylaluminum chloride. Alkyl aluminum chlorides having non integer decimal values of "n" can be obtained, according to the known technique, by mixing in suitable proportions aluminum chlorides and aluminum trialkyls and/or the respective mixed alkyl chlorides having "n" equal to 1 and 2.

The alkyl aluminum chloride having formula (II) can be added as such, or in the form of a solution in an inert organic solvent, selected from those used for the preparation of the mixture of step (i). The addition of the alkyl aluminum chloride can be effected by maintaining the reaction mixture under suitable conditions and checking the concentration of the titanium in solution, according to one of the known techniques, for example by taking samples and analysis, or by direct determination with calorimetric or other kinds of methods suitable for the purpose, until the desired precipitation level is reached. According to a preferred embodiment, it is possible to predetermine, for a certain reactive system, the quantity of alkyl aluminum chloride normally sufficient for precipitation, and then add the predetermined quantity of reagent, or even better, an excess to favour a more rapid formation of a granular solid, by subsequently reacting the mixture until the desired precipitate is formed. It is generally found that the minimum quantity of alkyl aluminum chloride suitable for the purpose can also be determined by means of a practical calculation method, according to the equation:

$$(\text{moles AlR'}_n\text{Cl}_{(3-n)})_{min.} = 2/(3-n) \cdot [(4 \cdot \text{molesTi} + 2 \cdot \text{molesMg} + 4 \cdot \text{molesHf} + 4 \cdot \text{molesZr} - \text{molesCl})_{in\ step(i)} + (\text{moles RCOOH})_{in\ step\ (ii)}]$$

The quantity of alkyl aluminum chloride having formula (II) preferably consists of an excess of 10 to 100% of the minimum quantity determined as described above. Higher excesses, although possible, are not advisable owing to the activation of undesired secondary reactions.

In step (iii) it is convenient to operate at a temperature ranging from 20 to 120° C. for a time which, depending on the pre-selected temperature, can vary from 0.5 to 8 hours. In the preferred embodiment, the alkyl aluminum chloride is added to the solution of step (ii) operating at a temperature ranging from room value (20–25° C.) to about 60° C., and the mixture obtained is heated and maintained at a temperature ranging from 50 to 100° C., for a time ranging from 45 top 180 minutes.

Operating under these conditions, the solid component of catalyst is obtained in the form of a granular precipitate or in powder form, preferably with an average particle diameter ranging from 1 to 20 µm.

The solid component of catalyst thus obtained is separated from the liquid in step (iv), usually with the normal liquid/solid separation methods excluding evaporation of the solvent, such as decanting, filtration or centrifugation, preferably washed with a hydrocarbon solvent and optionally dried.

All the process operations described above are conveniently carried out in a controlled inert atmosphere, for example nitrogen or argon, owing to the sensitivity of aluminum alkyis and solid component of catalyst to air and humidity.

According to a particular aspect of the present invention, said solid component, of catalyst can also be in a form supported on an inert solid, preferably having a controlled and narrow particle size. Suitable inert solids are those which do not modify the characteristics of the catalytic part mentioned above, particularly the quantity of Ti (+3), the ratios between the various elements and the carboxylate, and the particular coordinative characteristics of the titanium. Examples of these solids are inorganic solids such as silicon, aluminum oxides, mixed silica-alumina oxides, titanium oxide, silicates, silico-aluminates, zeolites, and other similar products. Polymeric organic solids, such as certain types of functionalized polystyrene can also be used as carrier. Preferred solids are silica, alumina (in its various forms), amorphous and crystalline silico-aluminates (zeolites). The quantity of inert carrier is normally selected so that it forms from 50 to 90% by weight of the resulting supported ,solid component. These supported solid components are particularly suitable for polvmerization processes in gas phase.

The inert solid carrier can be introduced, in the desired quantity, in accordance with the present invention, in suspension of the inert liquid in step (i) or, even better, in step (ii). In this way, the solid component is then precipitated onto the surface of the inert carrier, during step (iii), favoring its homogeneous distribution. Alternatively, said carrier can be impregnated with said solution in step (ii), and subsequently treated with the alkyl aluminum chloride of step (iii) to effect the precipitation of the solid component with a more homogeneous distribution on the inert carrier.

According to a further aspect, the present invention also relates to a catalyst for the (co)polymerization of α-olefins, and particularly ethylene, composed of the solid component of catalyst described above, combined with a hydride or an organometallic compound of a metal of groups 1, 2 or 13 of the periodic table. Aluminum trialkyls and alkyl aluminum halides (especially chlorides), which contain from 1 to 10, preferably from 2 to 6, carbon atoms in the alkyl portion, are preferably used as co-catalysts. Among these aluminum trialkyls, such as aluminum triethyl, aluminum tri-n-butyl, aluminum triisobutyl and aluminum trihexyl, are preferred. In the catalysts of the present invention, the atomic ratio between the aluminum (in the co-catalyst) and titanium (in the solid component of catalyst) generally varies from 2:1 to 500:1 and preferably from 5:1 to 200:1, depending on the particular polymerization system adopted and on its purity.

Said catalyst is formed according to the known techniques, by contact between the solid component and co-catalyst, preferably in a suitable liquid medium, usually a hydrocarbon, which can also consist of, or can contain, one or more of the olefins to be polymerized. Depending on the characteristics of the polymerization process in which the catalyst of the present invention is to be used, this can be prepared aside and subsequently introduced into the polymerization reactor, or it can be prepared in situ, by feeding the constituents separately to the reactor. The temperature at which the catalyst is prepared is not particularly critical, is within a wide range, and is preferably within the range of 0° C. to the operating temperature of the catalyst in the polymerization process. The formation of the catalyst is usually almost immediate already at room temperature, although, in certain cases, contact can be maintained between the components for 10 seconds to 30 minutes, depending on the temperature, before beginning the polymerization.

One or more additives or additional components can be optionally added to the above catalyst according to the present invention, to obtain a catalytic system suitable for satisfying specific requisites. The catalytic systems thus obtained should be considered as being included in the scope of the present invention. Additives or components which can be included in the preparation and/or formulation of the catalyst of the present invention are inert solvents, such as, for example, aliphatic and/or aromatic hydrocarbons, aliphatic and aromatic ethers, weakly coordinating additives (Lewis bases) selected for example, from non-polymerizable olefins, ethers, tertiary amines and alcohols, halogenating agents such as silicon halides, halogenated hydrocarbons, preferably chlorinates, and the like, and again all other possible components normally used in the art for the preparation of the traditional catalysts for the (co)polymerization of ethylene and other α-olefins.

The present invention also relates to (co)polymerization processes of α-olefins which use the catalyst described above. The catalysts according to the present invention can be used with excellent results in substantially all known (co)polymerization processes of α-olefins, both in continuous and batchwise, in one or more steps, such as for example, processes at low (0.1–1.0 MPa), medium (1.0–10 MPa) or high (10–150 MPa) pressure, at temperatures ranging from 20 to 300° C., optionally in the presence of an inert diluent. Hydrogen can be conveniently used as molecular weight regulator.

These processes can be carried out in solution or suspension in a liquid diluent normally consisting of aliphatic or cycloaliphatic saturated hydrocarbons having from 3 to 12, preferably from 6 to 10, carbon atoms, but which can also consist of a monomer such as for example, in the known copolymerization process of ethylene and propylene in liquid propylene. The quantity of catalyst introduced into the polymerization mixture is preferably selected so that the concentration of the titanium ranges from $10^{-4}$ to $10^{-8}$ moles/liter.

Alternatively, the polymerization can be carried out in gas phase, for example in a fluid bed reactor, normally at pressures ranging from 0.5 to 5 MPa and temperatures ranging from 50 to 150° C., in this case it being preferable for the solid component of the present invention to be of the supported type on an inert carrier, as described above.

The α-olefins which can be used in the above processes are preferably those containing from 2 to 20, more preferably from 2 to 8, carbon atoms, aliphatic, cycloaliphatic or aromatic, such as ethylene, propylene, 1-butene, 4-methyl-pent-1-ene, 1-hexene and 1-octene, ethylene-norbornene, styrene. Ethylene is particularly preferred, with reference to both homo-polymerization and co-polymerization processes, in which ethylene is however the prevalent monomer.

In particular the bimetal catalyst of the present invention can be used in the preparation of polymers and copolymer of ethylene with a surprisingly narrow molecular weight distribution with respect to those normally obtained in polymerization processes with bimetal catalysts.

The catalysts according to the present invention can be used with excellent results in the polymerization of ethylene to give linear polyethylene and in the copolymerization of ethylene with propylene or higher α-olefins, preferably having from 4 to 10 carbon atoms, to give copolymers having different characteristics depending on the specific polymerization conditions and on the quantity and structure of the α-olefin itself. For example, linear polyethylenes can be obtained with densities ranging from 0.880 to 0.9401 and with average molecular weights preferably ranging from 100,000 to 2,000,000. α-olefins preferably used as comonomers of ethylene in the production of linear low or medium density polyethylene (known with the abbreviations ULDPE, VLDPE and LLDPE depending on the density), are 1-butene, 1-hexene and 1-octene.

The catalyst of the present invention can also be conveniently used in copolymerization processes of ethylene and propylene to give saturated elastomeric copolymers vulcanizable by means of peroxides and extremely resistant to aging and degradation, or in the terpolymerization of ethylene, propylene and a non-conjugated diene having from 5 to 20 carbon atoms, to obtain vulcanizable rubbers of the EPDM type.

Examples of non-conjugated dienes typically used for the preparation of these copolymers are 5-ethylidene-2-norbornene (ENB), 1,4-hexadiene and 1,6-octadiene.

The catalyst according to the present invention can be particularly advantageously used in solution, high temperature (co)polymerization processes of α-olefins, and especially ethylene. These processes are normally carried out at temperatures ranging from 130 to 300° C. and at pressures ranging from 1 to 25 MPa, preferably from 5 to 20 MPa, in the presence of an inert liquid capable of maintaining the polymer formed in solution, at the process temperature. In this way a homogeneous reaction mixture is obtained (except for the catalyst) together with a flexible process which can be easily controlled, which allows short residence times and high productivities. Preferred liquids both for their dissolving characteristics of polyolefins, and for their relatively low toxicity, are aliphatic or cycloaliphatic hydrocarbons having from 6 to 10 carbon atoms, such as heptane, decane, cyclohexane and decaline. The polymer is then separated by precipitation or by devolatilization of the solvent. For general information on known processes of this type, reference can be made, among the numerous publications available, to "Encylcopedia of Polymer Science and Engineering", $2^{nd}$ edition (1986), volume 6, pages 471–472, John Wiley & Sons Ed.

As polyolefins, especially if semi-crystalline, are not very soluble in solvents, the use of relatively high temperatures, preferably from 150 to 230° C., is critical for carrying out these processes. The processes are carried out in adiabatic or isothermal reactors, depending on the technology adopted. It is known however that in polymerization processes at such high temperatures, the average molecular weight of the polymer obtained is significantly lowered, producing such high Melt Flow Index (MFI) levels as to be unacceptable for the normal transformation processes. The catalysts normally used in solution processes are based on vanadium, which however are not capable of producing polyolefins with satisfactory molecular weights for a wide range of applications, thus limiting the diffusion of the process itself, in spite of the above advantages. In addition, there is room for further improvement also with respect to the activity of these catalysts. On the other hand, the known catalysts of the Ziegler-Natta type based on titanium, normally used in suspension processes, are even less suitable than the previous ones when used at high temperatures, producing polyethylenes with particularly low molecular weights, unsuitable for most of the usual applications.

The catalyst according to the present invention, unexpectedly allows high average molecular weights polymers and copolymers of ethylene to be obtained, also operating at the above mentioned high temperatures, obtaining much lower MFI values (even of one order of magnitude) with respect to the traditional catalysts, used under the same process conditions.

The present invention, in its numerous aspects, is more specifically illustrated by the following figures and examples which are provided for purely illustrative purposes, without limiting in any way the overall scope of the present invention.

Figure 2:
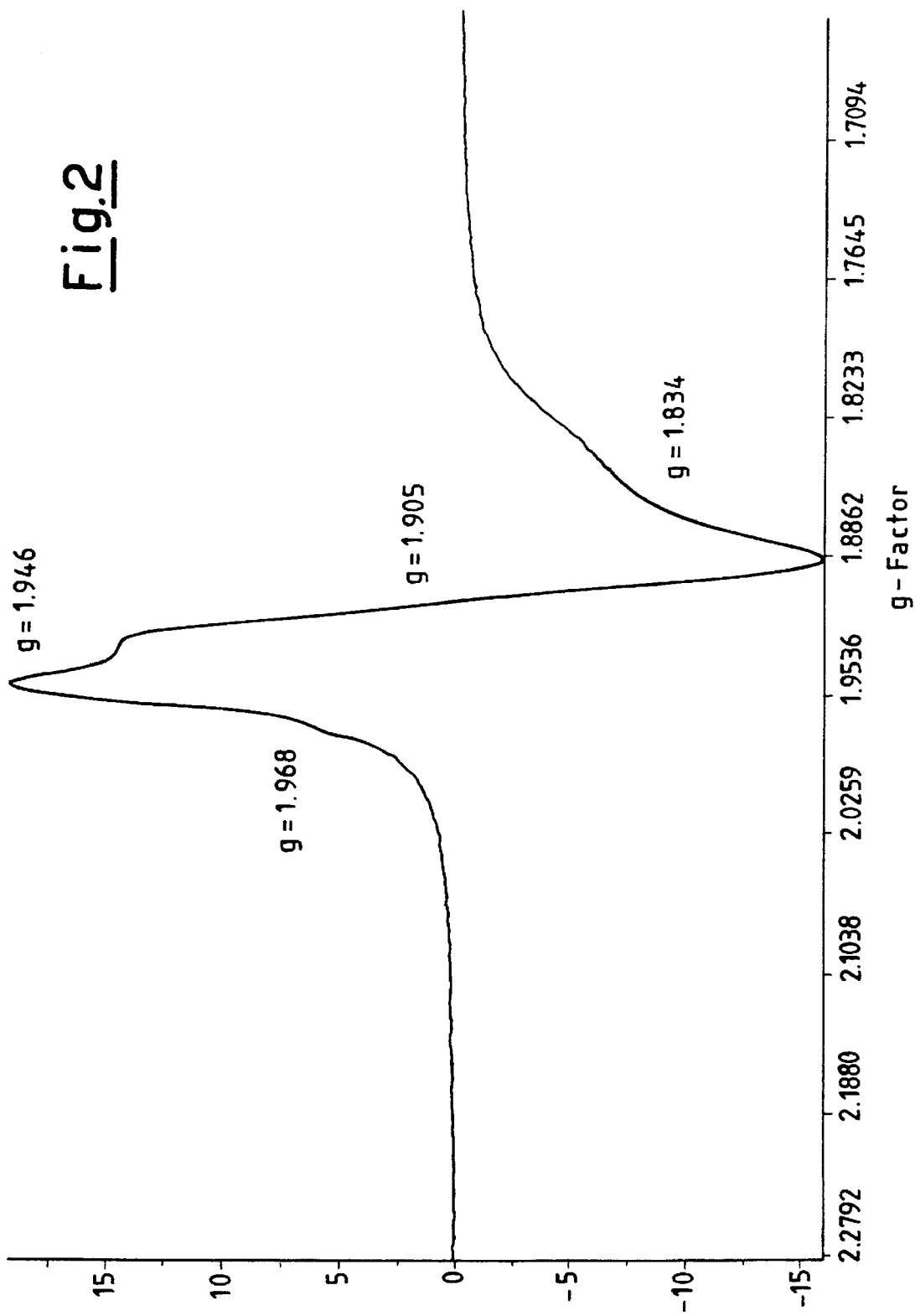

In particular, FIG. 1 represents the diagram as a derivative of the ESR spectrum relating to the solid component of catalyst obtained according to example 1 provided hereunder; FIG. 2 represents the diagram as a derivative of the ESR spectrum relating to the solid component of catalyst obtained according to example 5 (comparative) provided hereunder. In these diagrams, the derivative value, in arbitrary units, of the absorption spectrum is indicated in ordinate, the "g" factor value, as defined hereunder, appears in abscissa.

In both of the above cases, the ESR spectra were obtained with an ESR Bruker ESP 300E spectrometer equipped with an HP 5350B frequency meter which allows the frequency of the microwaves to be evaluated with an accuracy of up to 1 Hz, allowing the evaluation of the third decimal figure of the "g" factor of the electronic spin, measured in relation to the energy separation of the magnetic components.

In E.S.R. magnetic resonance spectroscopy, a magnetic field with a frequency ν is applied with an angle of 90 degrees with respect to the direction of the magnetic field H to cause the resonance transition.

The resonance energy of the transition is given by g=hν/βH, wherein:

$$\beta = \frac{eh}{4\pi mc} = 0.92731 \cdot 10^{-20} \text{ erg Gauss}$$

and H=magnetic induction vector expressed as Gauss thus allowing the measurement of the "g" factors, according to the technique described, for example, in the publication of F. E. Mabbs and D. Collison "Electron Paramagnetic Resonance of transition metal compounds", Elsevier, Amsterdam, (1992).

The quantitative evaluation of Ti +3 was effected by comparing the relative intensity of the ESR signals of the samples of catalyst with a mechanical mixture of $CuSO_4$ in $CaSO_4$ with a concentration of spins (atoms of $Cu^{2+}$=1.9× $10^{20}$ spins/g).

EXAMPLES

The following analysis and characterization methods were used.

Elemental Analysis

The quantitative analyses of the metal components of the solid components of catalyst (Ti, Zr, Hf, Mg, Al) were carried out by means of plasma spectrophotometry, after wet attack of the catalysts in powder form, by means of an ICP II Perkin Elmer 1000 instrument (emission spectrometer).

The chlorine content in the same samples was determined by potentiodynamic electrochemical analysis, after wet attack of the catalysts in powder form, using a second species Ag/AgCl electrode (titrating solution $AgNO_3$ 0.01 M) with a DOSIMAT 655 METROHM instrument. The relative titration curves were registered with a 672 METROHM titerprocessor.

X-Ray Diffractometry

The XRD spectrum of the samples of catalyst (in powder form) were registered by means of a Siemens D500TT diffractometer, using the Kα radiation of copper (λ=0.15418 nm). The spectra were processed using the Package Siemens DIFFPRAC-AT.

Melt Flow Index

The Melt Flow Index (MFI), correlated to the weight average molecular weight of the polymer, measured by means of the standard technique ASTM-D 1238 E. The MFI measured with a weight of 2.16 kg at 190° C., expressed as grams of molten-polymer in 10 minutes (g/10 min), is provided.

Shear Sensitivity (S.S.), calculated as a ratio between MFI at 2.16 kg and MFI at 21.6 kg, both measured according to the above ASTM standard technique. This parameter is normally correlated with the molecular weight distribution.

Reagents and Materials

The following reagents and materials were used in particular in the embodiments, object of the following examples. Unless otherwise specified, the products were used as received from the supplier. Magnesium chloride ($MgCl_2$, powder, purity>99.4%) produced by PECHINEY ITALIA, Titanium tetrabutylate ($Ti(n-Obu)_4$ purity>99.90%) produced by Du Pont under the trade-name of TYZOR BTM; Hafnium tetrachloride ($HfCl_4$, purity<95.5% (Zr<4.5%)) produced by Pechiney Italia; 2-ethyl-hexanoic acid (purity 99.00%) produced by BASF; Isobutyl Aluminum Dichloride (purity 99.90%) produced by WITCO; n-Decane, produced by Synthesis-(PR) under the trade-name of SYNTSOL LP 10, purified by passage on molecular sieves.

Example 1

The following products are charged in order into a 500 ml reactor:

70 ml of n-decane; 2.1 g (22.3 mmoles) of $MgCl_2$; 0.7 g (2.07 mmoles, 0.7 ml) of titanium tetrabutylate; and 0.95 g (2.96 mmoles) of hafnium tetrachloride $HfCl_4$.

13.3 g (75 mmoles, 12 ml) of 2-ethylhexanoic acid are subsequently slowly added at room- temperature and under stirring. The suspension thus obtained is heated to 90° C. and maintained at this temperature for 30 minutes in a closed reactor. A light yellow, slightly opalescent solution, is thus obtained.

After cooling the solution, obtained as described above, to room temperature, 19.3 g (124.5 mmoles, 17.2 ml) of isobutyl aluminum dichloride diluted into 40 ml of n-decane are added dropwise. The reaction mixture thus obtained is heated to 80° C. under stirring and maintained at this temperature for 2 hours. The dark brown-coloured solid obtained is separated from the mother liquor by decanting and is subsequently washed with two portions of n-decane of 400 ml each.

3.3 g of the desired solid component of catalyst are obtained, containing 2.7% by weight of titanium (synthesis yield 90% with respect to the initial titanium tetrabutylate), and characterized by the following molar ratios between the constituents:

Hf/Ti=1.6; Mg/Ti=8.5; Al/Ti=1.2; Cl/Ti=30.9; (2-ethylhexanoate)/Ti=0.8.

The X-ray spectrum shows the typical very wide signals which are typical of a disorderly structure of the "δ" type. The quantity of titanium in oxidation state +3 is 97% of the total titanium.

The ESR spectrum of the solid component thus obtained is indicated in FIG. 1. The signal having "g" at 1.968, when put in relation to the other two signals having "g" at 1.905 and 1.953, allows to be determined that 4% of Ti +3 experiments a tetra-coordinate neighborhood.

Example 2

The following products are charged in order into a 5000 ml reactor:

1000 ml of n-decane; 16 g (168 mmoles) of $MgCl_2$; 4.8 g (14.1 mmoles, 4.8 ml) of $Ti(n-OBu)_4$; and 2.3 g (7.2 mmoles) of $HfCl_4$.

76.6 g (531 mmoles, 84.8 ml) of 2-ethylhexanoic acid are subsequently slowly added at room temperature and under stirring. The suspension thus obtained is heated to 90° C. and maintained at this temperature for 30 minutes in a closed reactor. A light yellow slightly opalescent solution is thus obtained. After cooling the solution to room temperature, 136.7 g (882 mmoles, 122 ml) of isobutyl aluminum dichloride diluted in 320 ml of n-decane are added dropwise. The reaction mixture thus obtained is heated to 80° C. and maintained at this temperature for 2 hours in a closed reactor. The purple-pink solid obtained is separated from the mother liquor by decanting and is subsequently washed with two portions of n-decane of 1000 ml each.

23.1 g of the desired solid component of catalyst are obtained, containing 2.5% by weight of titanium (synthesis yield 90% with respect to the initial titanium tetrabutylate), and characterized by the following molar ratios between the constituents:

Hf/Ti=0.5; Mg/Ti=15.2; Al/Ti=0.6; Cl/Ti=36; (2-ethylhexanoate)/Ti=1.0.

The X-ray spectrum shows the typical very wide signals which are typical of a disorderly structure of the "δ" type. The quantity of titanium in oxidation state +3 is 98% of the total titanium.

Example 3

The following products are charged in order into a 5000 ml reactor:

800 ml of n-decane; 19 g (200 mmoles) of $MgCl_2$; 5.7 g (16.7 mmoles, 5.7 ml) of Ti(n-OBu)4; and 13.5 g (42.1 mmoles) of $HfCl_4$.

105.6 g (732 mmoles, 117 ml) of 2-ethylhexanoic acid are subsequently slowly added at room temperature and under stirring. The same procedure is adopted as in example 1 above and a light yellow slightly opalescent solution is obtained. After cooling the solution to room temperature, 185.8 g (1199 mmoles, 165.9 ml) of isobutyl aluminum dichloride diluted in 433 ml of n-decane are added dropwise. The reaction mixture thus obtained is heated to 80° C. and maintained at this temperature for 2 hours in a closed reactor.

At the end, after cooling, a purple-pink solid precipitate is obtained, which is separated from the mother liquor by decanting and is subsequently washed with two 1000 ml portions of n-decane.

40.2 g of the desired solid component of catalyst are obtained, containing 1.7% by weight of titanium (synthesis yield 85% with respect to the initial titanium tetrabutylate), and characterized by the following molar ratios between the constituents:

Hf/Ti=3.0; Mg/Ti=13.1; Al/Ti=0.9; Cl/Ti=42; (2-ethylhexanoate)/Ti=2.6.

The X-ray spectrum shows the typical very wide signals which are typical of a disorderly structure of the "δ" type. The quantity of titanium in oxidation state +3 is 98% of the total titanium.

Example 4

The following products are charged in order into a 500 ml reactor:

100 ml of n-decane; 3.05 g (32 mmoles) of $MgCl_2$; 0.95 g (2.8 manoles, 0.95 ml) of $Ti(n-OBu)_4$; and 4.5 g (14 mmoles) of $HfCl_4$.

19.9 g (138 mmoles, 22 ml) of 2-ethylhexanoic acid are subsequently slowly added at room temperature and under stirring. The same procedure is adopted as in example 1 above, obtaining at the end a honey-yellow coloured solution. After cooling the solution to room temperature, 34.7 g (224 mmoles, 31 ml) of isobutyl aluminum dichloride diluted in 81 ml of n-decane are added dropwise. The reaction mixture thus obtained is heated to 80° C. and maintained at this temperature for 2 hours. The dark brown-coloured solid obtained is separated from the mother liquor by decanting and is subsequently washed with two 400 ml portions of n-decane.

7.1 g of the desired solid component of catalyst are obtained, containing 1.6% by weight of titanium (synthesis yield 85% with respect to the initial titanium tetrabutylate), and-characterized by the following molar ratios between the constituents:

Hf/Ti=4.3; Mg/Ti=9.0; Al/Ti=2.1; Cl/Ti=39.4; (2-ethylhexanoate)/Ti=5.1.

The X-ray spectrum shows the typical very wide signals which are typical of a disorderly structure of the "δ" type.

Example 5

The following products are charged in order into a 5000 ml reactor:

1000 ml of n-decane; 17 g (181 mmoles) of $MgCl_2$; 5.1 g (15 mmoles, 5.1 ml) of $Ti(n-OBu)_4$; and 5.24 g (22.5 mmoles) of $ZrCl_4$.

88.2 g (613 mmoles, 97.7 ml) of 2-ethylhexanoic acid are subsequently slowly added at room temperature and under stirring. The mixture thus obtained is heated to 90° C. and maintained at this temperature for 30 minutes. A light yellow slightly opalescent solution is thus obtained.

After cooling the solution to room temperature, 155.6 g (1004 mmoles, 139 ml) of isobutyl aluminum dichloride diluted in 363 ml of n-heptane are added dropwise. The reaction mixture thus obtained is heated to 98° C. and maintained at this temperature for 2 hours.

The purple solid obtained is separated from the mother liquor by decanting and is subsequently washed with two 1000 ml portions of n-heptane.

26.9 g of the desired solid component of catalyst are obtained, containing 2.4% by weight of titanium (synthesis yield 90% with respect to the initial titanium tetrabutylate), and characterized by the following molar ratios between the constituents:

Zr/Ti=2.1; Mg/Ti=9.3; Al/Ti=1.1; Cl/Ti=30.5; (2-ethylhexanoate)/Ti=2.8.

The X-ray spectrum shows the typical very wide signals which are typical of a disorderly structure of the "δ" type.

Example 6 Comparative

For comparative purposes, a solid component of catalyst was prepared in accordance with the method based on the use of pre-prepared metal carboxylates, as described in the above-mentioned patent EP-A 523,785.

1) Preparation of the Solution of MgCl(2-Ethylhexanoate).

11.4 g (107.7 mmoles) of $MgCl_2$ suspended in 100 ml of n-decane are charged into a 500 ml reactor. 46.6 g (323 mmoles, 51.6 ml) of 2-ethylhexanoic acid are then slowly added at room temperature and under stirring. The reaction mixture is brought to a temperature of 100° C., and the chlorine present is partially removed by bubbling nitrogen into the suspension for a duration of 5 hours.

104 ml of a limpid light yellow-coloured solution are obtained at the end, containing the following concentrations of dissolved substances: Mg=1034 mmol/l, Cl=786 mmoles/l, 2-ethyl-hexanoic acid=3102 mmoles/l.

2) Preparation of the Solution of $HfCl_2$(2-Ethyl-hexanoate)$_2$ 20 g (62.4 mmoles) of $HfCl_4$, suspended in 150 ml of n-decane, are charged into a 500 ml reactor., 18 g (124.8 mmoles, 19.9 ml) of 2-ethylhexanoic acid are then slowly added at room temperature and under stirring.

The reaction mixture is brought to a temperature of 100° C., and the chlorine present is partially removed by bubbling nitrogen into the suspension for a duration of 5 hours. Not all of the solid dissolves, and it is, necessary to carry-out a filtration on a porous septum. At the end, 131 ml of a limpid light yellow-coloured solution are obtained, containing: Hf=95.4 mmol/l, Cl=174.8 mmoles/l, 2-ethyl-hexanoic acid=191 mmoles/l.

3) Preparation of the Solution of $TiCl_2(2\text{-Ethyl-hexano-ate})_2$ 4.3 g (22.7 mmoles, 2.5 ml) of $TiCl_4$ dissolved in 100 ml of n-decane are charged into a 500 ml reactor. 6.5 g (45.1 mmoles, 7.2 ml) of 2-ethylhexanoic acid are then slowly added at room temperature and under stirring. The reaction mixture is brought to a temperature of 100° C., and the chlorine present is partially removed by bubbling nitrogen into the suspension for a duration of 5 hours. 69 ml of a limpid dark green-coloured solution are obtained, containing the following concentrations of dissolved substances: Ti=330 mmol/l, Cl=650 mmoles/l, 2-ethyl-hexanoic acid= 660 mmoles/l.

4) Preparation of the Solid Component of Catalyst

The following products are charged in order into a 500 ml reactor:

- 150 ml of n-decane
- 20 ml of the solution of MgCl(2-ethylhexanoate) prepared as described above, containing 6.5 g (20.7 mmoles) of Mg and 8.95 g (62 mmoles) of 2-ethylhexanoic acid and 0.56 g (15.8 mmoles) of chlorine.
- 25.2 ml of the solution of $HfCl_2(2\text{-ethylhexanoate})_2$ prepared as described above, containing 0.44 g (2.5 mmoles) of Hf, 0.16 g (4.5 mmoles) of chlorine and 0.72 g (5 mmoles) of 2-ethylhexanoic acid.
- 5.7 ml of the solution of $TiCl_2(2\text{-ethylhexanoate})_2$ prepared as described above, containing 0.44 g (2.5 mmoles) of Ti, 0.13 g (3.7 mmoles) of chlorine and 0.54 g (3.76 mmoles) of 2-ethylhexanoic acid.

A limpid mixture is formed to which 17.5 g of isobutyl aluminum dichloride (113 mmoles) diluted with 42 ml of n-decane, are slowly added dropwise, at a temperature of about 30° C. At the end of the addition, the temperature is brought to about 80° C. and the mixture is maintained for two hours under stirring. A finely suspended reddish-brown solid is formed, which is separated from the mother liquor by decanting and is subsequently washed with two 400 ml portions of n-heptane.

2.8 g of solid component of catalyst are obtained, containing 2.8% by weight of titanium (synthesis yield 85% with respect to the titanium initially introduced) and characterized by the following molar ratios between the constituents:

Hf/Ti=1.3; Mg/Ti=9.2; Al/Ti=1.7; Cl/Ti=31.1; (2-ethylhexanoate)/Ti=0.6.

On the basis of the X-ray spectrum the solid proves to have a disorderly structure of the "δ" type. The quantity of titanium in oxidation state +3 is 97%.

The ESR spectrum of the solid component thus obtained is indicated in FIG. 2. The absence of the signal at "g"=1968, present in the spectrum indicated in FIG. 1, relating to the solid component according to example 1 of the present invention, is noted.

Example 7 Comparative

For comparative purposes, a solid component of catalyst based on titanium alone, instead of titanium and hafnium was prepared. The process used is analogous to that of the present invention.

The following products are charged in order into a 500 ml reactor:

100 ml of n-decane; 5.6 g (58.8 mmoles) of $MgCl_2$ and 1.3 g (3.8 mmoles, 1.3 ml) of $Ti(n\text{-OBu})_4$. 25.4 g (176 mmoles, 28.1 ml) of 2-ethylhexanoic acid are subsequently slowly added at room temperature and under stirring.

The suspension thus obtained is heated to 90° C. and maintained at this temperature for 30 minutes in a closed reactor. At the end, about 15% by weight of initial $MgCl_2$ remains undissolved, as a fine particulate in suspension. After cooling to room temperature, the mixture thus obtained is reacted with isobutyl aluminum dichloride, without separation of the solid remaining undissolved in the previous step. In particular, 44.6 g (288 mmoles, 39.8 ml) of isobutyl aluminum dichloride, diluted in 104 ml of n-decane are added to the mixture, which is then heated to 80° C. and maintained at this temperature for 2 hours.

The pale pink-coloured obtained is separated from the mother liquor by decanting and is subsequently washed with two 400 ml portions of n-decane. 6.1 g of solid component of catalyst are obtained, containing 2.6% by weight of titanium, with a synthesis yield with respect to the initial Ti equal to 85%, and characterized by the following molar ratios between the constituents:

Mg/Ti=12.6; Al/Ti=2.7; Cl/Ti=34.4; (2-ethylhexanoate)/Ti=1.9

The quantity of titanium in oxidation state +3 is 98%.

Examples 8–16

(Co-polymerization of Ethylene in Solution)

Various polymerization tests were carried out under relatively homogeneous conditions between each other, using the components of catalyst obtained as described above.

General Procedure

The following products are charged in order into a 5 liter high pressure reactor, equipped with stirring, a manometer and suitable connections for the feeding of the gaseous reagents: 2.0 liters of anhydrous n-decane as solvent, aluminum triethyl, acting as co-catalyst and impurity scavenger, 74 ml of 1-hexene as comonomer, and the solid component of catalyst. The temperature is brought to the desired level, normally between 210 and 220° C., and ethylene is rapidly introduced, the liquid being maintained under stirring, until the desired pressure is reached.

The copolymerization reaction is continued for 5 minutes and is then interrupted by the addition of ethanol saturated with carbon dioxide (16 g (350 mmoles), 20 ml of ethanol with 10 g (230 mmoles) of carbon dioxide (dry ice)).

The polymer formed is precipitated by the addition of methanol and is washed again with methanol. It is then dried in a stream of air, weighed and characterized by measuring the density, the Melt Flow Index (MFI) and Shear Sensitivity, in accordance with what is specified above.

The references, conditions and results of the polymerization tests are schematically summarized in TABLE 1 below, of which the columns indicate in succession, for each example, the example number, the preparation example of the solid component of catalyst used, the quantity of this in mg and the corresponding quantity of titanium in $\mu$ moles, the polymerization temperature and pressure, the quantity of polymer obtained and its density, MFI and Shear Sensitivity characteristics, and finally the catalyst activity referring to the titanium. Examples 15 and 16 are comparative examples.

TABLE 1

Co-polymerization of ethylene and 1-hexene
General conditions: 2 liters n-decane; 50 ml 1-hexene; residence time = 5 minutes

| | | Solid component | | | | | Polymer obtained | | | | |
|---|---|---|---|---|---|---|---|---|---|---|---|
| Ex. Nr. | Ex. Prep. | Quantity (mg) | Ti ($\mu$moles) | Al(Et)$_3$ (mmoles) | T (° C.) | P$_{total}$ (MPa) | Quantity (g) | Density (g/cm$^3$) | MFI$_{(2.16kg)}$ (g/10 min) | Shear Sens. | Cat. Activ. (kg$_{polymer}$/mole Ti |
| 8 | 1 | 37.0 | 21 | 1.00 | 210 | 1.3 | 55.5 | 0.9295 | 0.27 | 37.5 | 57.0 |
| 9 | 1 | 40.6 | 23 | 0.50 | 225 | 1.3 | 52.8 | 0.9306 | 0.74 | 34.1 | 48.0 |
| 10 | 1 | 37.0 | 21 | 0.50 | 220 | 1.5 | 62.9 | 0.9302 | 0.44 | 32.9 | 63.0 |
| 11 | 2 | 48.8 | 25 | 1.00 | 215 | 1.5 | 34.2 | 0.9290 | 0.50 | 39.8 | 27.5 |
| 12 | 3 | 69.4 | 25 | 1.00 | 217 | 1.5 | 48.6 | 0.9280 | 0.60 | 38.5 | 40.6 |
| 13 | 4 | 79.8 | 28 | 1.00 | 215 | 1.5 | 39.9 | 0.9270 | 0.50 | 37.4 | 30.0 |
| 14 | 5 | 50.0 | 25 | 0.50 | 218 | 1.5 | 40.0 | 0.9325 | 0.90 | 40.0 | 33.3 |
| 15(*) | 6 | 42.4 | 25 | 1.00 | 217 | 1.5 | 33.9 | 0.9310 | 3.11 | 34.9 | 27.5 |
| 16(*) | 7 | 40.6 | 23 | 1.00 | 214 | 1.5 | 32.5 | 0.9294 | 8.17 | — | 27.0 |

(*) = Comparative example

Example 17

2000 ml of anhydrous n-decane, 57 mg (0.5 mmoles, 0.07 ml) of aluminum triethyl, 45 g (536 mmoles, 66 ml) of 1-hexene and 12.2 mg of solid component of catalyst of example 1 equivalent to 0.33 mg (6.9 $\mu$moles) of Ti, are charged in this order into a 5 liter reactor.

The polymerization temperature is brought to 183° C. and the pressure to 1.3 MPa with ethylene. The reaction is continued for 5 minutes and is then interrupted by the addition of a mixture containing 20 ml of ethanol, 10 g of carbon dioxide (dry ice).

At the end, 63 g of polyethylene are obtained, with an activity of 188 kg of polyethylene per mole of titanium in the solid component. The polyethylene thus obtained has the following properties:

MFI (2.16 Kg)=0.02 dg/min with Shear Sensitivity of 43.4; density=0.9244 g/ml.

Example 18

2000 ml of anhydrous n-decane, 57 mg (0.5 mmoles, 0.07 ml) of aluminum triethyl, 35 g (417 mmoles, 52 ml) of 1-hexene and 29.6 mg of solid component of catalyst of example 1 equivalent to 0.8 mg (16.7 $\mu$moles) of Ti, are charged in this order into a 5 liter reactor.

The polymerization temperature is brought to 218° C. and the pressure to 1.3 MPa with ethylene. The same procedure is then adopted as in example 17 above. At the end 48 g of polyethylene are obtained with a yield of 59 kg of polyethylene per mole of titanium in the solid component. The polyethylene thus obtained has the following properties:

MFI (2.16 Kg)=0.3 g/10 min; Shear Sensitivity=34.5; density=0.9312 g/ml.

Example 19

2000 ml of anhydrous n-decane, 57 mg (0.5 mmoles, 0.07 ml) of aluminum triethyl, 67 g (598 mmoles, 94 ml) of 1-octene and 44.4 mg of solid component of catalyst of example 1 equivalent to 1.2 mg (25.0 $\mu$moles) of Ti, are charged in this order into a 5 liter reactor.

The polymerization temperature is brought to 220° C. and the pressure to 1.45 MPa with ethylene. The same procedure is then adopted as in example 17 above. At the end 55 g of polyethylene are obtained with a yield of 45.8 Kg of polyethylene per mole of titanium in the solid component. The polyethylene thus obtained has the following properties:

MFI (2.16 Kg)=0.76 dg/min with Shear Sensitivity=37.4; density=0.9275 g/ml.

Example 20

2000 ml of anhydrous cyclohexane, 99 mg (0.5 mmoles, 0.07 ml) of aluminum triisobutyl, 50 g (595 mmoles, 75 ml) of 1-hexene and 37 mg of solid component of catalyst of example 1 equivalent to 1.0 mg (20.9 $\mu$moles) of Ti, are charged in this order into a 5 liter reactor.

The polymerization temperature is brought to 173° C. and the pressure to 1.4 MPa with ethylene. The same procedure is then adopted as in example 17 above. At the end 85 g of polyethylene are obtained with a yield of 86 kg of polyethylene per mole of titanium in the solid component. The polyethylene thus obtained has the following properties:

MFI (2.16 kg)=0.1 g/10 min with shear sensitivity=30.4; density=0.9087 g/ml.

What is claimed is:

1. A solid component of catalyst for the (co) polymerization of $\alpha$-olefins, comprising at least 95% by weight, based on the total weight of the solid component of catalyst, of titanium, magnesium, aluminum, chlorine, carboxylate (R—COO$^-$) and at least one metal selected from the group consisting of hafnium and zirconium, in the following molar ratios:

M/Ti=0.1–10.0; Mg/Ti=1.0–20.0; Al/Ti=0.01–6.0

Cl/Ti=2.0–70.0; R—COO$^-$/Ti=0.1–10.0 wherein: R is an aliphatic, cycloaliphatic or aromatic hydrocarbon radical, containing from 1 to 30 carbon atoms, and M is hafnium, zirconium or mixtures thereof,
wherein at least 80% of the titanium is in oxidation state +3 and, in addition, at least 1% of said titanium in oxidation state +3 has a tetrahedral coordination geometry.

2. The solid component according to claim 1, characterized by the following molar ratios:

M/Ti=0.3–5.0; Mg/Ti=5.0–15.0; Al/Ti=0.1–3.0

Cl/Ti=20.0–50.0; R—COO$^-$/Ti=0.5–5.0.

3. The solid component of catalyst according to claim 1, wherein M is hafnium.

4. The solid component of catalyst according to claim 1, wherein at least 90% of the titanium is in oxidation state +3, and from 2 to 10% of said titanium has a tetrahedral coordination geometry.

5. The solid component of catalyst according to claim 1, wherein the number of carbon atoms of the radical R of said carboxylate ranges from 6 to 15.

6. The solid component of catalyst according to claim 1, wherein the titanium content does not exceed 10% by weight.

7. A process for the preparation of a solid component of catalyst for the (co)polymerization of α-olefins, comprising at least 95% by weight, based on the total weight of the solid component of catalyst, of titanium, magnesium, aluminum, chlorine, carboxylate (R—COO$^-$) and at least one metal selected from the group consisting of hafnium and zirconium, in the following molar ratios:

M/Ti=0.1–10.0; Mg/Ti=1.0–20.0; Al/Ti=0.01–6.0

Cl/Ti=2.0–70.0; R—COO$^-$/Ti=0.1–10.0 wherein: R is an aliphatic, cycloaliphatic or aromatic hydrocarbon radical, containing from 1 to 30 carbon atoms, and M is hafnium, zirconium or mixtures thereof, wherein said process comprises the following steps in succession:

(i) preparing a mixture of at least one compound of magnesium, a compound of titanium and at least one compound of a metal M selected from zirconium and hafnium, in the appropriate proportions, in a medium consisting of an inert organic liquid, in which at least one of said compounds is insoluble;

(ii) preparing a substantially limpid solution by the addition to said mixture of step (i) of a sufficient quantity of a carboxylic acid having the formula R—COOH (I), wherein R is an aliphatic, cycloaliphatic or aromatic hydrocarbon radical, containing from 1 to 30 carbon atoms, and maintaining this, under suitable conditions of pressure and temperature, and with no significant removal of hydrochloric acid, if formed, until the substantial dissolution of all the insoluble compound;

(iii) adding and reacting with the solution obtained in step (ii) an alkyl aluminum chloride which can be represented with the following general formula (II):

$$AlR'_nCl_{(3-n)} \quad (II)$$

wherein R' is a linear or branched alkyl radical, containing from 1 to 20 carbon atoms, and "n" is a decimal number having values ranging from 0.5 to 2.5, in a quantity which is at least sufficient to make at least 70% of the titanium present in the solution of said step (ii) precipitate into the form of a solid compound, and (iv) separating the solid precipitated in step (iii) from the residual liquid to obtain said solid component of catalyst.

8. The process according to claim 7, wherein said metal M is hafnium and said R group of the R—COOH carboxylic acid comprises from 6 to 15 carbon atoms.

9. The process according to claim 7, wherein said inert organic liquid used for preparing the mixture of step (i) is selected from aliphatic, cycloaliphatic and aromatic hydrocarbons.

10. The process according to claim 7, wherein at least two compounds selected from those of magnesium, hafnium and zirconium in step (i) are insoluble in said inert organic liquid and form a suspension therein.

11. The process according to claim 7, wherein at least 50% by weight of the compounds of step (i) is insoluble in the preselected inert organic liquid.

12. The process according to claim 7, wherein said compounds in step (i) are mixed with the inert organic liquid with an overall concentration of the soluble and insoluble metals ranging from 0.05 to 2.0 moles/l.

13. The process according to claim 7, wherein the magnesium and the at least one metal selected from hafnium and zirconium, are introduced into the mixture of step (i) as chlorides in the form of granular solids or in powder form.

14. The process according to claim 7, wherein the dissolution temperature in step (ii) ranges from 70 to 120° C.

15. The process according to claim 7, wherein said step (ii) is carried out so that there are no significant exchanges of matter with the outside.

16. The process according to claim 7, wherein, in step (iii), "n" of said alkyl aluminum chloride having formula (II), is a decimal number ranging from 0.9 to 2.1.

17. The process according to claim 7, wherein the quantity of said alkyl aluminum chloride used in said step (iii) ranges from 1.1 to 2.0 times the minimum quantity predetermined by means of the equation:

(moles AlR'$_n$Cl$_{(3-n)})_{min.}$=2/(3−n)·[(4·molesTi+2·molesMg+ 4·molesHf+4·molesZr−molesCl)$_{in\ step(i)}$+ (molesRCOOH)$_{in\ step\ (ii)}$].

18. The process according to claim 7, wherein, in step (iii), the alkyl aluminum chloride is added to the solution of step (ii) operating at values ranging from room temperature (20–25° C.) to a temperature of about 60° C., and the mixture obtained is heated and maintained at a temperature ranging from 50 to 100° C., for a time ranging from 45 to 180 minutes.

19. A solid component of catalyst for the (co) polymerization of α-olefins, comprising at least 95% by weight, based on the total weight of the solid component of catalyst, of titanium, magnesium, aluminum, chlorine, carboxylate (R—COO$^-$) and at least one metal selected from the group consisting of hafnium and zirconium, in the following molar ratios:

M/Ti=0.1–10.0; Mg/Ti=1.0–20.0; Al/Ti=0.01–6.0

Cl/Ti=2.0–70.0; R—COO$^-$/Ti=0.1–10.0 wherein: R is an aliphatic, cycloaliphatic or aromatic hydrocarbon radical, containing from 1 to 30 carbon atoms, and M is a metal selected from hafnium, zirconium and mixtures thereof wherein at least 80% of the titanium is in oxidation state +3 and, in addition, at least 1% of said titanium in oxidation state +3 has a tetrahedral coordination geometry obtained by the process according to claim 7.

20. The solid component of catalyst according to claim 1, comprising from 98 to 100%, by weight, based on the total weight of the solid component of catalyst, of titanium, magnesium, aluminum, chlorine, carboxylate (R—COO$^-$) and at least one metal selected from the group consisting of hafnium and zirconium.

21. A catalyst for the (co)polymerization of α-olefins, comprising a co-catalyst consisting of a hydride or an organometallic compound of a metal of groups 1, 2 or 13 of the periodic table, and a solid component, in contact with each other, wherein said solid component comprises the solid component of catalyst according to claim 1.

22. The catalyst according to the claim 21, wherein said co-catalyst is selected from aluminum trialkyls which contain from 1 to 10 carbon atoms in the alkyl portion.

23. The catalyst according to claim 22, wherein the atomic ratio between the aluminum in the co-catalyst and the titanium in the solid component of catalyst ranges from 2:1 to 500:1.

24. A process for the (co)polymerization of α-olefins, comprising polymerizing at least one α-olefin, either continuously or batchwise, in one or more steps, at low (0.1–1.0 MPa), medium (1.0–10 MPa) or high (10–150 MPa) pressure, at temperatures ranging from 20 to 300° C., optionally in the presence of an inert diluent, in the presence of a catalyst, wherein the latter is a catalyst according to claim 21.

25. The (co)polymerization process according to claim 24, wherein at least one α-olefin is ethylene.

26. The (co)polymerization process according to claim 24, wherein ethylene is polymerized to give linear polyethylene, or copolymerized with α-olefins having from 3 to 10 carbon atoms.

27. The (co)polymerization process according to claim 24, wherein said polymerization process is carried out in a solution of an inert solvent, at temperatures ranging from 130 to 300° C. and at pressures ranging from 1 to 25 MPa.

28. The (co)polymerization process according to claim 24, wherein said inert solvent is selected from aliphatic or cycloaliphatic hydrocarbons having from 6 to 10 carbon atoms.

29. The (co)polymerization process according to claim 24, wherein the polymerization temperature ranges from 150 to 230° C.

30. The solid component of catalyst according to claim 19, comprising from 98 to 100%, by weight, based on the total weight of the solid component of catalyst, of titanium, magnesium, aluminum, chlorine, carboxylate (R—COO$^-$) and at least one metal selected from the group consisting of hafnium and zirconium.

31. A catalyst for the (co)polymerization of α-olefins, comprising a co-catalyst consisting of a hydride or an organometallic compound of a metal of groups 1, 2 or 13 of the periodic table, and a solid component, in contact with each other, wherein said solid component comprises the solid component of catalyst according to claim 19.

32. The catalyst according to claim 21, wherein said co-catalyst is selected from aluminum trialkyls which contain from 2 to 6 carbon atoms in the alkyl portion.

33. The catalyst according to claim 22, wherein the atomic ratio between the aluminum in the co-catalyst and the titanium in the solid component of catalyst ranges from 5:1 to 200:1.

34. The catalyst according to claim 32, wherein the atomic ratio between the aluminum in the co-catalyst and the titanium in the solid component of catalyst ranges from 2:1 to 500:1.

35. The catalyst according to claim 32, wherein the atomic ratio between the aluminum in the co-catalyst and the titanium in the solid component of catalyst ranges from 5:1 to 200:1.

36. The catalyst according to claim 31, wherein said co-catalyst is selected from aluminum trialkyls which contain from 1 to 10 carbon atoms in the alkyl portion.

37. The catalyst according to claim 31, wherein said co-catalyst is selected from aluminum trialkyls which contain from 2 to 6 carbon atoms in the alkyl portion.

38. The catalyst according to claim 36, wherein the atomic ratio between the aluminum in the co-catalyst and the titanium in the solid component of catalyst ranges from 2:1 to 500:1.

39. The catalyst according to claim 36, wherein the atomic ratio between the aluminum in the co-catalyst and the titanium in the solid component of catalyst ranges from 5:1 to 200:1.

40. The catalyst according to claim 37, wherein the atomic ratio between the aluminum in the co-catalyst and the titanium in the solid component of catalyst ranges from 2:1 to 500:1.

41. The catalyst according to claim 37, wherein the atomic ratio between the aluminum in the co-catalyst and the titanium in the solid component of catalyst ranges from 5:1 to 200:1.

42. A process for the (co)polymerization of α-olefins, comprising polymerizing at least one α-olefin, either continuously or batchwise, in one or more steps, at low (0.1–1.0 MPa), medium (1.0–10 MPa) or high (10–150 MPa) pressure, at temperatures ranging from 20 to 300° C., optionally in the presence of an inert diluent, in the presence of a catalyst according to claim 31.

43. The (co)polymerization process according to claim 42, wherein at least one α-olefin is ethylene.

44. The (co)polymerization process according to claim 42, wherein ethylene is polymerized to give linear polyethylene, or copolymerized with α-olefins having from 3 to 10 carbon atoms.

45. The (co)polymerization process according to claim 42, wherein said polymerization process is carried out in a solution of an inert solvent, at temperatures ranging from 130 to 300° C. and at pressures ranging from 1 to 25 MPa.

46. The (co)polymerization process according to claim 42, wherein said inert solvent is selected from aliphatic or cycloaliphatic hydrocarbons having from 6 to 10 carbon atoms.

47. The (co)polymerization process according to claim 42, wherein the polymerization temperature ranges from 150 to 230° C.

48. The process according to claim 7 wherein the quantity of alkyl aluminum chloride is at least sufficient to make from 80 to 100% of the titanium present in the solution of said step (ii) precipitate into the form of a solid compound.

49. The process according to claim 7 wherein said solid component of catalyst for the (co)polymerization of α-olefins, comprises 98 to 100% by weight, based on the total weight of the solid component of catalyst of titanium, magnesium, aluminum, chlorine, carboxylate (R—COO$^-$) and at least one metal selected from the group consisting of hafnium and zirconium.

* * * * *